(12) United States Patent
Mayberry et al.

(10) Patent No.: US 12,512,779 B2
(45) Date of Patent: Dec. 30, 2025

(54) INCREASED MOTOR TORQUE CAPABILITY THROUGH TIME-BASED THERMAL DERATING

(71) Applicant: GM Global Technology Operations LLC, Detroit, MI (US)

(72) Inventors: Michael Mayberry, Detroit, MI (US); Brent Steven Gagas, Pleasant Ridge, MI (US); Daniel J. Berry, Macomb Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 191 days.

(21) Appl. No.: 18/521,226

(22) Filed: Nov. 28, 2023

(65) Prior Publication Data

US 2025/0175112 A1    May 29, 2025

(51) Int. Cl.
   *G05B 5/00*      (2006.01)
   *B60L 15/20*     (2006.01)
   *H02P 29/64*     (2016.01)

(52) U.S. Cl.
   CPC .............. *H02P 29/64* (2016.02); *B60L 15/20* (2013.01); *B60L 2240/425* (2013.01)

(58) Field of Classification Search
   CPC .......... H02P 29/64; H02P 29/60; H02P 29/68; H02P 29/032; H02P 6/34
   See application file for complete search history.

(56) References Cited

FOREIGN PATENT DOCUMENTS

| CN | 116946101 A | * | 10/2023 | ............. | B60W 20/11 |
| CN | 118337121 A | * | 7/2024  | ..........    | H02M 7/5387 |

* cited by examiner

*Primary Examiner* — Karen Masih
(74) *Attorney, Agent, or Firm* — CANTOR COLBURN LLP

(57) ABSTRACT

A vehicle includes a system that performs a method of derating a motor of the vehicle. The system includes a timer and a processor. The processor is configured to start the timer when a temperature of a stator of the motor exceeds a high temperature threshold, select a blend ratio based on a time value on the timer, determine, using the blend ratio, an intermediate derating curve for the motor by interpolating between a first derating curve associated with a first target temperature and a second derating curve associated with a second target temperature greater than the first target temperature, and derate the motor along the intermediate derating curve.

20 Claims, 10 Drawing Sheets

INCREASED MOTOR TORQUE CAPABILITY THROUGH TIME-BASED THERMAL DERATING

INTRODUCTION

The subject disclosure relates to thermal derating of a torque on a motor and, more specifically, to moving a derating curve of the motor to allow for short term operation of the motor at high temperatures.

An electric vehicle includes an electric motor that provides power to the vehicle. Stator windings of the motor heat up as the electric motor operates. The motor can operate at low temperatures for a long time without causing thermal damage to the stator windings. The motor can operate at high temperatures for only a short time before thermal damage occurs. Currently, a derating algorithm for the motor is available only for operation of the motor at low temperatures, thereby underutilizing the full torque capacity of the motor. Accordingly, it is desirable to provide a method for the motor to operate at extended capacity for a short time before operating at lower temperatures.

SUMMARY

In one exemplary embodiment, a method of derating a motor of a vehicle is disclosed. A timer starts when a temperature of a stator of the motor exceeds a high temperature threshold. A blend ratio is selected based on a time value on the timer. An intermediate derating curve is determined, using the blend ratio, for the motor by interpolating between a first derating curve associated with a first target temperature and a second derating curve associated with a second target temperature greater than the first target temperature. The motor is derated along the intermediate derating curve.

In addition to one or more of the features described herein, the first derating curve is associated with a long-term operation of the motor and the second derating curve is associated with a short-term operation of the motor.

In addition to one or more of the features described herein, the method further includes incrementing the timer between a first time and a second time, determining a first intermediate derating curve at the first time, determining a second intermediate derating curve at the second time, and derating along a resultant derating trajectory that connects a first operating point on the first intermediate derating curve at the first time to a second operating point on the second intermediate derating curve at the second time.

In addition to one or more of the features described herein, the second intermediate derating curve is closer to the first derating curve than the first intermediate derating curve.

In addition to one or more of the features described herein, the method further includes selecting the blend ratio from a blend curve that relates the blend ratio to time via one of a sigmoid curve and a modified sigmoid curve.

In addition to one or more of the features described herein, the method further includes storing the blend curve as one of an equation and a look up table.

In addition to one or more of the features described herein, the method further includes increasing a torque at the motor to operate the motor in an extended capacity region between the first target temperature and the second target temperature after the temperature of the motor drops below a recovery temperature threshold.

In another exemplary embodiment, a system for derating a motor of a vehicle is disclosed. The system includes a timer and a processor. The processor is configured to start the timer when a temperature of a stator of the motor exceeds a high temperature threshold, select a blend ratio based on a time value on the timer, determine, using the blend ratio, an intermediate derating curve for the motor by interpolating between a first derating curve associated with a first target temperature and a second derating curve associated with a second target temperature greater than the first target temperature, and derate the motor along the intermediate derating curve.

In addition to one or more of the features described herein, the first derating curve is associated with a long-term operation of the motor and the second derating curve is associated with a short-term operation of the motor.

In addition to one or more of the features described herein, the processor is further configured to increment the timer between a first time and a second time, determining a first intermediate derating curve at the first time, determine a second intermediate derating curve at the second time, and derate along a resultant derating trajectory that connects a first operating point on the first intermediate derating curve at the first time to a second operating point on the second intermediate derating curve at the second time.

In addition to one or more of the features described herein, the second intermediate derating curve is closer to the first derating curve than the first intermediate derating curve.

In addition to one or more of the features described herein, the processor is further configured to select the blend ratio from a blend curve that relates the blend ratio to time via one of a sigmoid curve and a modified sigmoid curve.

In addition to one or more of the features described herein, the processor is further configured to store the blend curve as one of an equation and a look up table.

In addition to one or more of the features described herein, the processor is further configured to increase a torque at the motor to operate the motor in an extended capacity region between the first target temperature and the second target temperature after the temperature of the motor drops below a recovery temperature threshold.

In yet another exemplary embodiment, a vehicle is disclosed. The vehicle includes a timer and a processor. The processor is configured to start the timer when a temperature of a stator of a motor exceeds a high temperature threshold, select a blend ratio based on a time value on the timer, determine, using the blend ratio, an intermediate derating curve for the motor by interpolating between a first derating curve associated with a first target temperature and a second derating curve associated with a second target temperature greater than the first target temperature, and derate the motor along the intermediate derating curve.

In addition to one or more of the features described herein, the first derating curve is associated with a long-term operation of the motor and the second derating curve is associated with a short-term operation of the motor.

In addition to one or more of the features described herein, the processor is further configured to increment the timer between a first time and a second time, determining a first intermediate derating curve at the first time, determine a second intermediate derating curve at the second time, and derate along a resultant derating trajectory that connects a first operating point on the first intermediate derating curve at the first time to a second operating point on the second intermediate derating curve at the second time.

In addition to one or more of the features described herein, the second intermediate derating curve is closer to the first derating curve than the first intermediate derating curve.

In addition to one or more of the features described herein, the processor is further configured to select the blend ratio from a blend curve that relates the blend ratio to time via one of a sigmoid curve and a modified sigmoid curve.

In addition to one or more of the features described herein, the processor is further configured to increase a torque at the motor to operate the motor in an extended capacity region between the first target temperature and the second target temperature after the temperature of the motor drops below a recovery temperature threshold.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
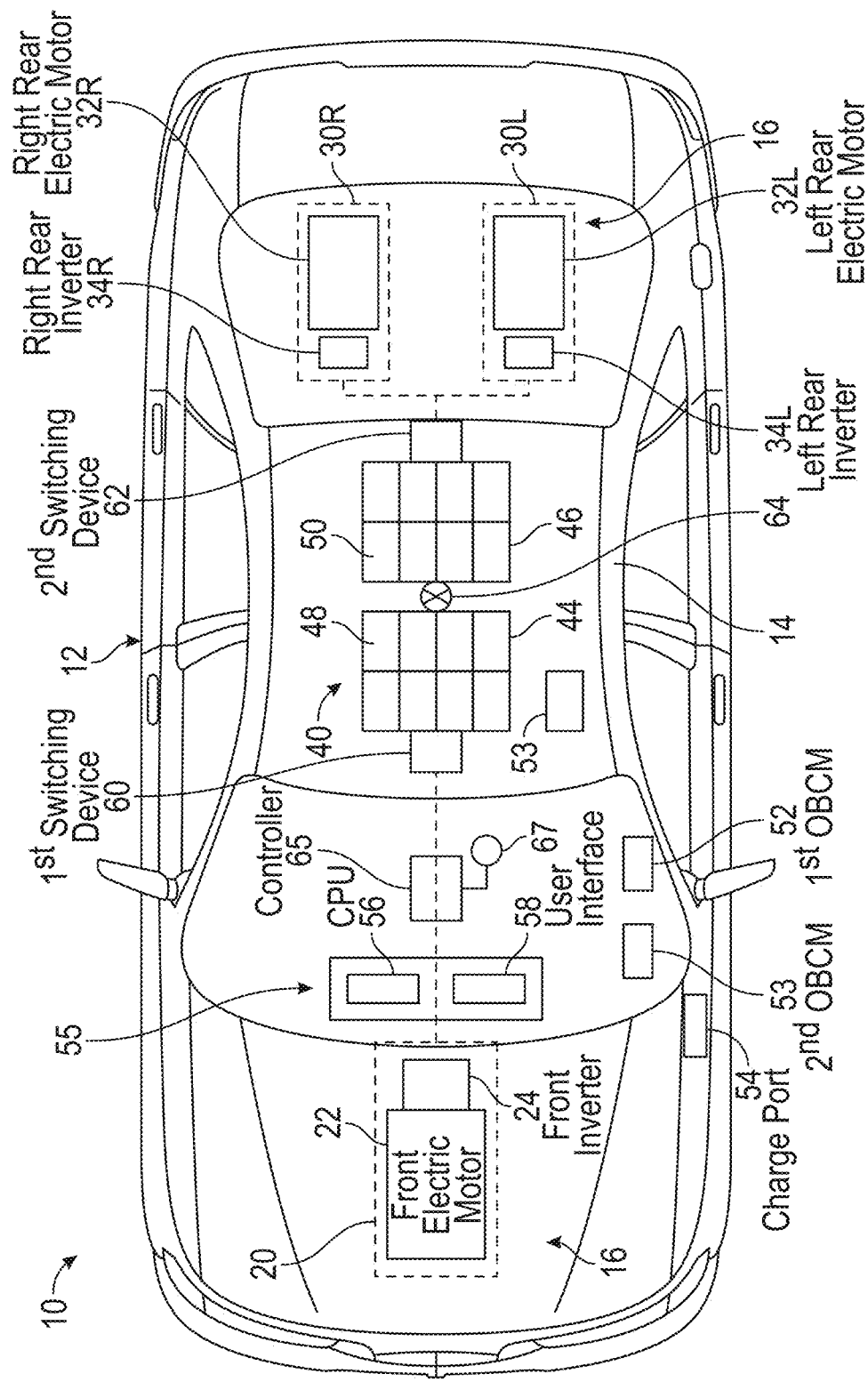
FIG. 1 shows a vehicle in an illustrative embodiment.

The following description is merely exemplary in nature and is not intended to limit the present disclosure, its application or uses. It should be understood that throughout the drawings, corresponding reference numerals indicate like or corresponding parts and features.

FIG. 1 shows an embodiment of a vehicle 10, which includes a vehicle body 12 defining, at least in part, an occupant compartment 14. The vehicle body 12 also supports various vehicle subsystems including a propulsion system 16, and other subsystems to support functions of the propulsion system 16 and other vehicle components, such as a braking subsystem, a suspension system, a steering subsystem, and others.

The vehicle 10 may be an electrically powered vehicle (EV), a hybrid vehicle or any other vehicle. In an embodiment, the vehicle 10 is an electric vehicle that includes multiple motors and/or drive systems. Any number of drive units may be included, such as one or more drive units for applying torque to front wheels (not shown) and/or to rear wheels (not shown). The drive units are controllable to operate the vehicle 10 in various operating modes, such as a normal mode, a high-performance mode (in which additional torque is applied), all-wheel drive ("AWD"), front-wheel drive ("FWD"), rear-wheel drive ("RWD") and others.

For example, the propulsion system 16 is a multi-drive system that includes a front drive unit 20 for driving front wheels, and rear drive units for driving rear wheels. The front drive unit 20 includes a front electric motor 22 and a front inverter 24 (e.g., front power inverter module or FPIM), as well as other components such as a cooling system. A left rear drive unit 30L includes a left rear electric motor 32L and a left rear inverter 34L. A right rear drive unit 30R includes a right rear electric motor 32R and a right rear inverter 34R. The front inverter 24, left rear inverter 34L and right rear inverter 34R (e.g., power inverter units or PIMs) each convert direct current (DC) power from a high voltage (HV) battery system 40 to poly-phase (e.g., two-phase, three-phase, six-phase, etc.) alternating current (AC) power to drive the front electric motor 22 the left rear electric motor 32L and the right rear electric motor 32R.

As shown in FIG. 1, the drive systems feature separate electric motors. However, embodiments are not so limited. For example, instead of separate motors, multiple drives can be provided by a single machine that has multiple sets of windings that are physically independent.

As also shown in FIG. 1, the drive systems are configured such that the front electric motor 22 drives the front wheels (not shown), and the left rear electric motor 32L and right rear electric motor 32R drive the rear wheels (not shown). However, embodiments are not so limited, as there may be any number of drive systems and/or motors at various locations (e.g., a motor driving each wheel, twin motors per axle, etc.). In addition, embodiments are not limited to a dual drive system, as embodiments can be used with a vehicle having any number of motors and/or power inverters.

In the propulsion system 16, the front drive unit 20, left rear drive unit 30L and right rear drive unit 30R are electrically connected to the battery system 40. The battery system 40 may also be electrically connected to other electrical components (also referred to as "electrical loads"), such as vehicle electronics (e.g., via an auxiliary power module or APM 42), heaters, cooling systems and others. The battery system 40 may be configured as a rechargeable energy storage system (RESS).

In an embodiment, the battery system 40 includes a plurality of separate battery assemblies, in which each battery assembly can be independently charged and can be used to independently supply power to a drive system or systems. For example, the battery system 40 includes a first battery assembly such as a first battery pack 44 connected to the front inverter 24, and a second battery pack 46. The first battery pack 44 includes a plurality of battery modules 48, and the second battery pack 46 includes a plurality of battery modules 50. Each battery module 48, 50 includes a number of individual cells (not shown). In various embodiments, one or more of the battery packs can include a MODACS (Multiple Output Dynamically Adjustable Capacity) battery.

Each of the front electric motor 22 and the left rear electric motor 32L and right rear electric motor 32R is a three-phase motor having three phase motor windings. However, embodiments described herein are not so limited. For example, the motors may be any poly-phase machines supplied by poly-phase inverters, and the drive units can be realized using a single machine having independent sets of windings.

The battery system 40 and/or the propulsion system 16 includes a switching system having various switching devices for controlling operation of the first battery pack 44 and second battery pack 46, and selectively connecting the first battery pack 44 and second battery pack 46 to the front drive unit 20, left rear drive unit 30L and right rear drive unit 30R. The switching devices may also be operated to selectively connect the first battery pack 44 and the second battery pack 46 to a charging system. The charging system can be used to charge the first battery pack 44 and the second battery pack 46, and/or to supply power from the first battery pack 44 and/or the second battery pack 46 to charge another energy storage system (e.g., vehicle-to-vehicle (V2V) and/or vehicle-to-everything (V2X) charging). The charging system includes one or more charging modules. For example, a first onboard charging module (OBCM) 52 is electrically connected to a charge port 54 for charging to and from an AC system or device, such as a utility AC power supply. A second OBCM 53 may be included for DC charging (e.g., DC fast charging or DCFC).

In an embodiment, the switching system includes a first switching device 60 that selectively connects to the first battery pack 44 to the front inverter 24, left rear inverter 34L and right rear inverter 34R, and a second switching device 62 that selectively connects the second battery pack 46 to the front inverter 24, left rear inverter 34L and right rear inverter 34R. The switching system also includes a third switching device 64 (also referred to as a "battery switching device") for selectively connecting the first battery pack 44 to the second battery pack 46 in series.

Any of various controllers can be used to control functions of the battery system 40, the switching system and the drive units. A controller includes any suitable processing device or unit, and may use an existing controller such as a drive system controller, an RESS controller, and/or controllers in the drive system. For example, a controller 65 may be included for controlling switching and drive control operations as discussed herein.

The vehicle 10 also includes a computer system 55 that includes one or more processing devices 56 and a user interface 58. The computer system 55 may communicate with the charging system controller, for example, to provide commands thereto in response to a user input. The various processing devices, modules and units may communicate with one another via a communication device or system, such as a controller area network (CAN) or transmission control protocol (TCP) bus.

As illustrated herein, the vehicle 10 is an electric vehicle. In an alternative embodiment, the vehicle 10 can be an internal combustion engine vehicle, a hybrid vehicle, etc.

Figure 2:
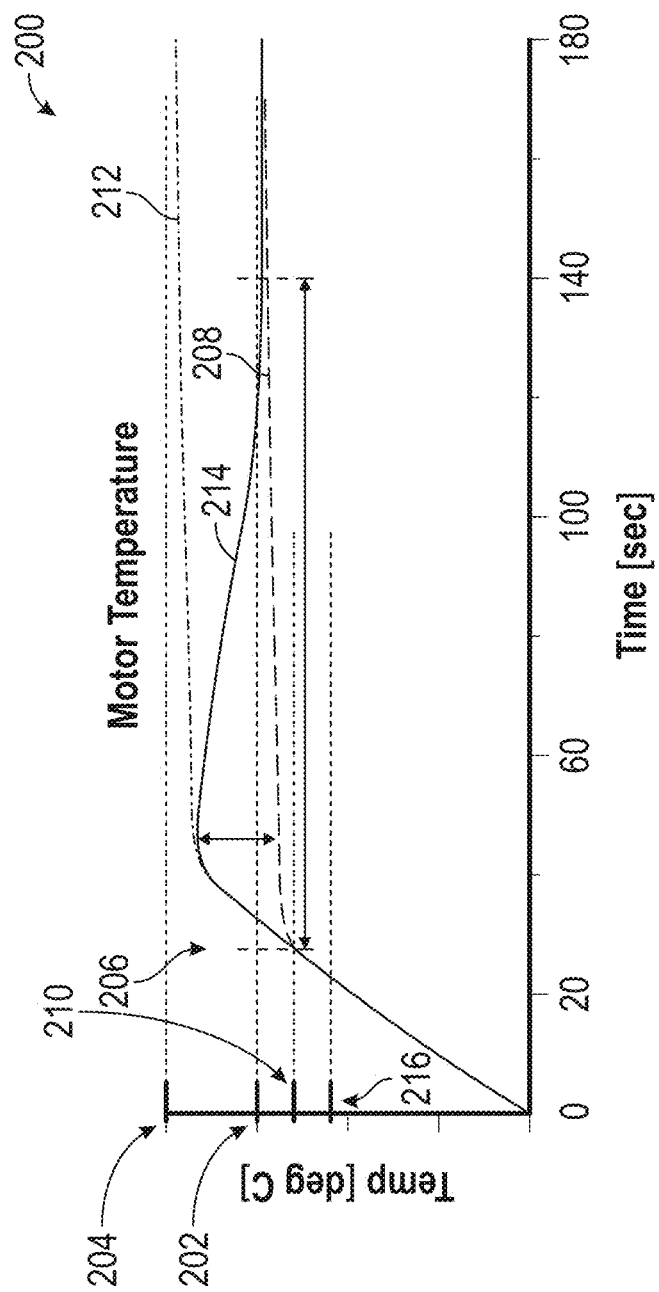
FIG. 2 is a graph showing operating temperatures for a motor, in an illustrative embodiment.

FIG. 2 is a graph 200 showing operating temperatures for a motor, in an illustrative embodiment. Time is shown in seconds along the abscissa and temperature is shown in degrees Celsius along the ordinate axis. A long-term target temperature 202 (first target temperature) and a short-term target temperature 204 (second target temperature) are shown. The motor can operate at the long-term target temperature 202 for a long period of time (e.g., days, months) without thermal damage occurring at the motor. The motor can operate at the short-term target temperature 204 for a short period of time (e.g., seconds, minutes) before thermal damage occurs at the motor. The long-term target temperature 202 and the short-term target temperature 204 can be pre-set values. The long-term target temperature 202 is less than the short-term target temperature 204. The difference between the long-term target temperature 202 and the short-term target temperature 204 defines an extended capacity operating region 206 for the motor.

A long-term operating line 208 shows stable operation of the motor. The long-term operating line 208 rises at a first rate during operation of the motor. At a set temperature, referred to herein as a high temperature threshold 210, derating is implemented at the motor to flatten the long-term operating line 208. Thus, the long-term operating line 208 approaches the long-term target temperature asymptotically.

A short-term operating line 212 shows unstable operation of the motor. The short-term operating line 212 rises at the first rate and into the extended capacity operating region 206. Derating begins at a higher temperature than the high temperature threshold 210. Thus, the short-term operating line 212 approaches the short-term target temperature 204 asymptotically. Operating in the extended capacity operation region for a long period of time (as shown by the short-term operating line 212) degrades the lifetime of the windings and is therefore undesirable.

The method disclosed herein allows the motor to operate along the short-term operating line 212 into the extended capacity operating region 206 but also changes a derating schedule for the operation to lower the operating temperature toward the long-term target temperature 202. Changing the derating schedule results in the operating trajectory 214. The operating region for the motor is therefore bounded by the long-term operating line 208 and the short-term operating line 212, and the temperature of the motor does not rise above the short-term operating line 212.

Once the motor temperature drops to a value equal to or less than a recovery temperature threshold, the motor can be operated again within the extended capacity region. In FIG. 2 the recovery temperature threshold 216 is shown below the high temperature threshold 210. However, the recovery temperature threshold 216 can be equal to or less than the high temperature threshold 210.

Figure 3:
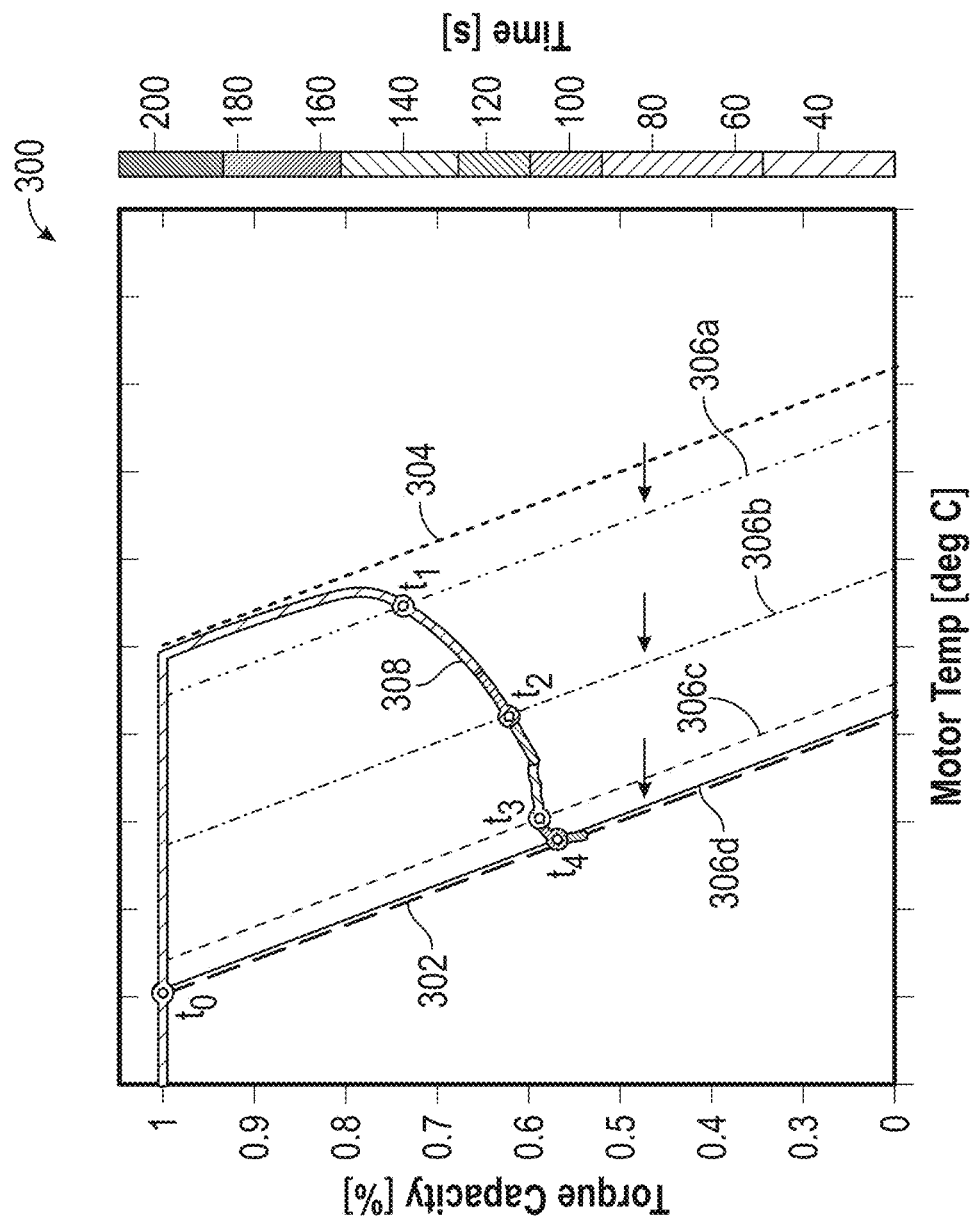
FIG. 3 is a graph showing various torque-temperature derating curves.

FIG. 3 is a graph 300 showing various torque-temperature derating curves. Motor temperature is shown in degrees Celsius along the abscissa and motor torque capacity is shown as a percentage along the ordinate axis. A torque-temperature derating curve defines a relation by which a torque capacity of the motor can be managed according to temperature. As temperature increases, the torque capacity is decreased. As temperature decreases, the torque capacity is increased. A long-term torque-temperature derating curve is shown by first derating curve 302. The long-term torque-temperature derating curve cause the motor to operate along the long-term operating line 208. A short-term torque-temperature derating curve is shown by second derating curve 304. The second derating curve 304 causes the motor to operate the motor along the short-term operating line 212.

A plurality of intermediate torque-temperature derating curves 306a, 306b, 306c, 306d are shown between the first derating curve 302 and the second derating curve 304. Although four intermediate curves are shown for illustrative purposes, there can be any number intermediate curves. During operation, the derating can occur along a sequence of derating curves, generally moving from the short-term torque-temperature derating curve to the long-term torque-temperature derating curve sequentially through the intermediate torque-temperature derating curve 306a, 306b, 306c, 306d. moving through the selected derating curves creates a resultant derating trajectory 308, as discussed herein. The resultant derating trajectory 308 corresponds to the operating trajectory 214 of FIG. 2.

Figure 4:
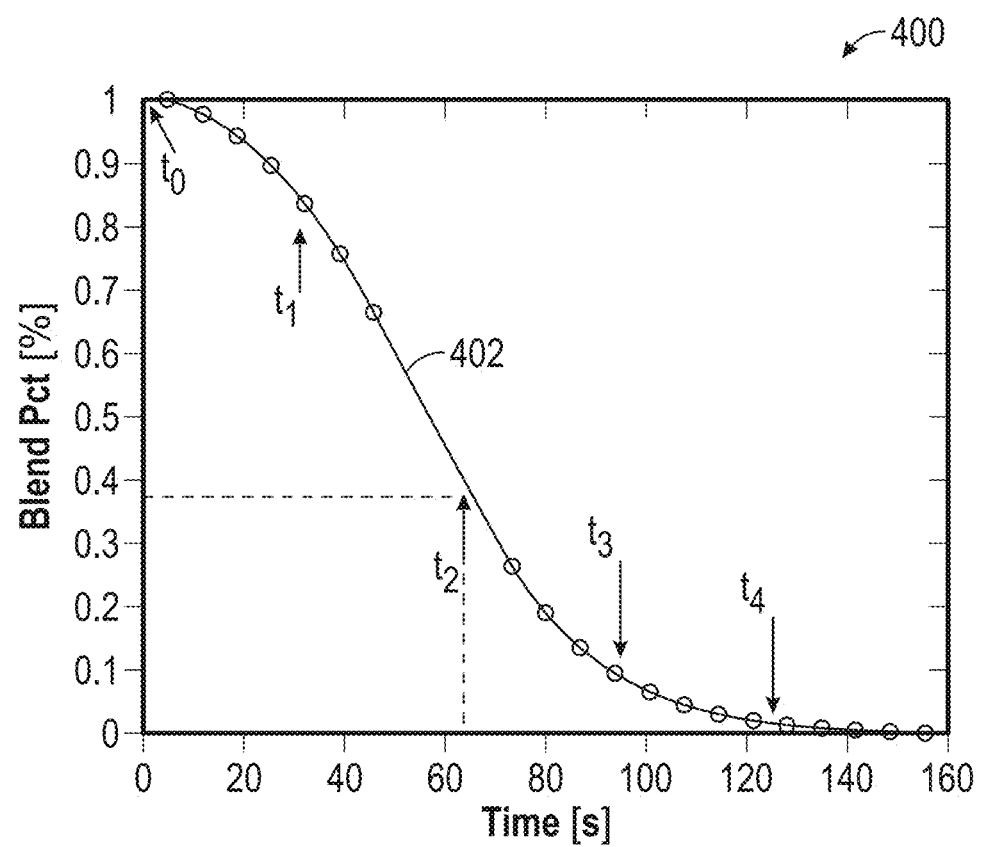
FIG. 4 is a graph depicting a blend curve used in determining the intermediate torque-temperature derating curves.

FIG. 4 is a graph 400 depicting a blend curve 402 used in determining the intermediate torque-temperature derating curves. Time is shown in seconds along the abscissa and blend ratio is shown as a percentage along the ordinate axis. The blend curve 402 relates a blend ratio to time and includes values of blend ratios for each point in time. In an embodiment, the blend curve 402 can be stored as an equation at a processor. Alternatively, the blend ratios of the blend curve 402 can be stored in a look up table. The blend ratios start at 100% at time t=0 and ends at or near 0% at time=$T_{max}$.

A clock or timer 67 (FIG. 1) can start when a temperature of the motor exceeds a baseline temperature (e.g., the high temperature threshold 210). The blend ratio is obtained periodically as the timer is running. For each blend ratio, an intermediate derating curve can be calculated, as shown in FIG. 5.

Figure 5:
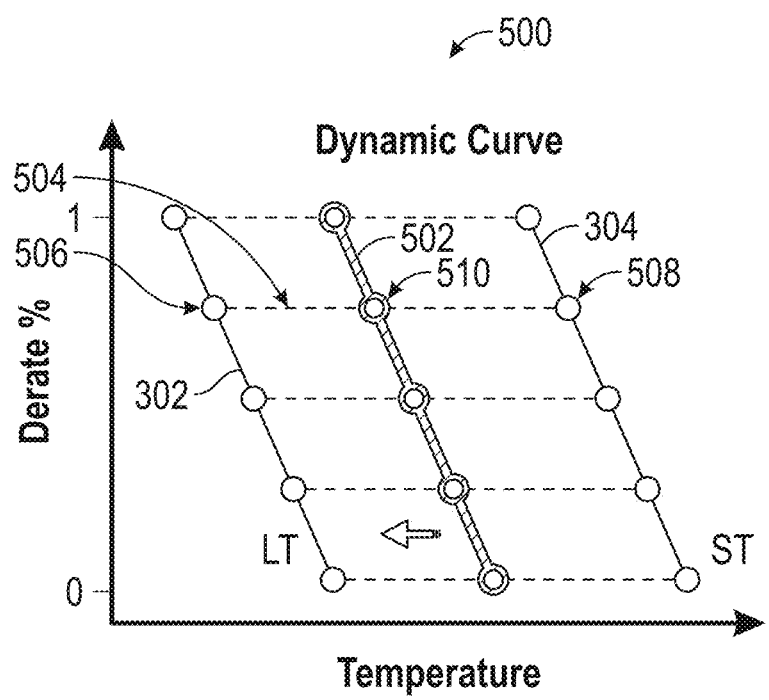
FIG. 5 is a graph illustrating a method determining an intermediate derating curve using the blend curve shown in FIG. 4.

FIG. 5 is a graph 500 illustrating a method determining an intermediate derating curve 502 using the blend curve 402 shown in FIG. 4. The first derating curve 302 and the second derating curve 304 are shown. Referring to FIG. 4, a blend ratio is selected for a time value. For example, at time $t_2$, at blend ratio of about 38% is selected. The blend ratio is then used to interpolate the first derating curve 302 and the second derating curve 304 to obtain the intermediate derating curve 502. Interpolation is performed for each torque capacity percentage value so that each point on the first derating curve 302 and the second derating curve 304 is interpolated.

If the system has an over-temperature diagnostic, the over-temperature threshold can be modified to include the impact of changing the derating curve with time. The blend ratio and the temperature offset between the first derating curve 302 and the second derating curve 304 can be multiplied to find a dynamic offset that is added to an existing static over-temperature threshold value. For example, if point 506 of the first derating curve 302 is chosen as the long-term over-temperature threshold, then point 508 on the second derate curve 304 is the value of the dynamic over-temperature threshold when the blend ratio is equal to one. The threshold value will then trend toward point 506 as the blend ratio value is reduced to zero. The calculation of the dynamic over-temperature threshold at every sample instant is shown mathematically in Eq. (1):

$$\text{dynamic over temperature threshold} = \text{static over temperature threshold} + (\text{offset} * \text{blend ratio}) \quad \text{Eq. (1)}$$

A new derating curve can be calculated on a periodic basis. As time progresses, a new blend ratio is selected from the blend curve and a new derating curve is determined using the new blend ratio. Since the blend ratio decreases as time increases, as seen in FIG. 4, each successive derating curve line moves in a direction from the second derating curve 304 to the first derating curve 302.

Specifically, a first intermediate derating curve can be determined at a first time (e.g., t1 on FIG. 4) and a second intermediate derating curve can be determined at a second time (e.g., t2 on FIG. 4). The motor moves from a first operating point on the first intermediate derating curve at the first time to second operating point on the second intermediate derating curve at the second time. In the process, the operating points of the motor draw the resultant derating trajectory.

Figure 6:
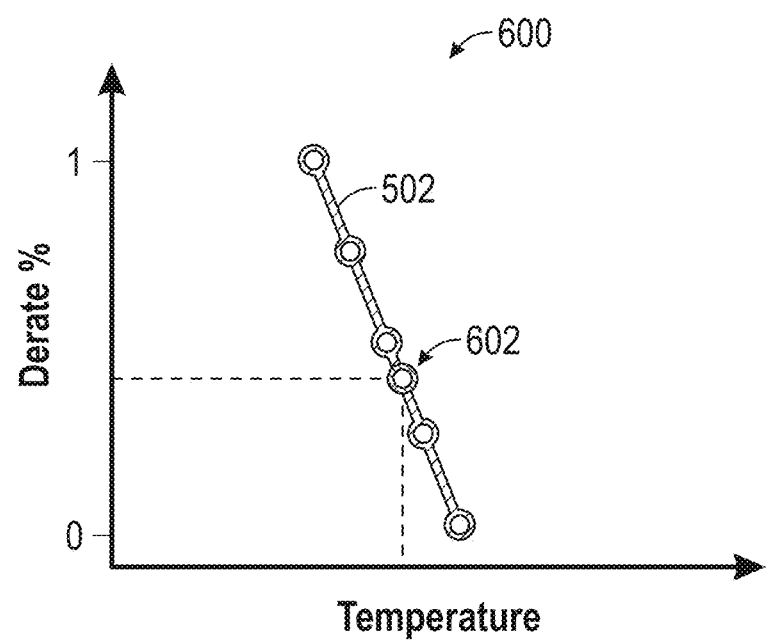
FIG. 6 illustrates the intermediate derating curve obtained from the interpolation performed in FIG. 5.

FIG. 6 illustrates the intermediate derating curve 502 obtained from the interpolation performed in FIG. 5. The intermediate derating curve 502 is applicable for a single time step and is recalculated at a next time step. The current temperature of the motor is used to select a point on the intermediate derating curve 502, which the selects the available torque to be used at the motor.

Figure 6A:
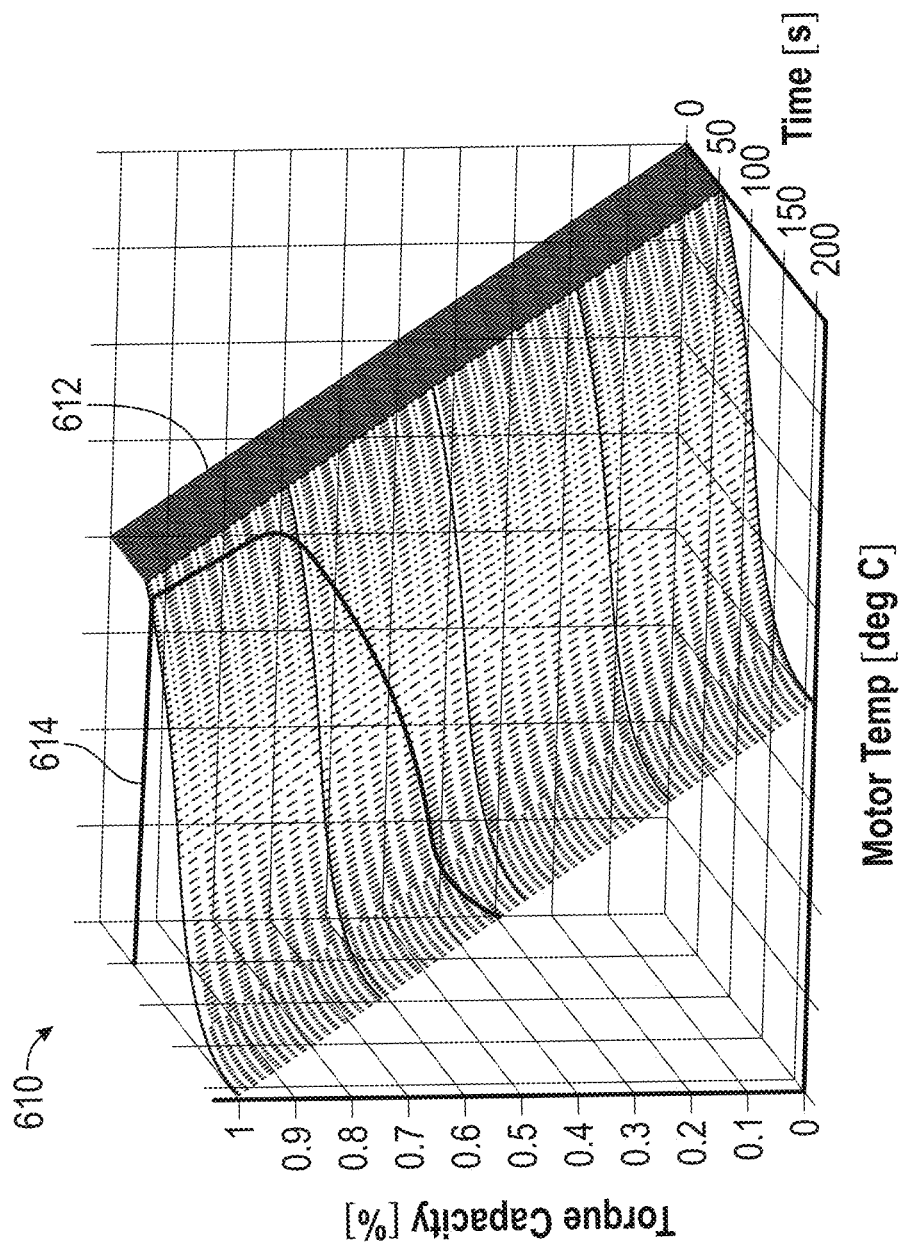
FIG. 6A illustrates a graphical representation of a two-dimensional lookup table that can be used to return a torque derating percentage, in an alternate embodiment.

FIG. 6A is a graphical representation of a two-dimensional lookup table 610 that can be used to return a torque derating percentage, in an alternate embodiment. The lookup table is represented by a three-dimensional surface 612. The lookup table includes two inputs (i.e., time and motor temperature) which shown along the x-axis and y-axis. The input values are used to locate a torque capacity percentage or derate percentage, which is shown along the z-axis. A derating trajectory curve 614 along the three-dimensional surface 612 shows the changing in torque capacity percentage over time. The derating trajectory curve 614 is equivalent to the resultant derating trajectory 308 of FIG. 3.

Figure 7:
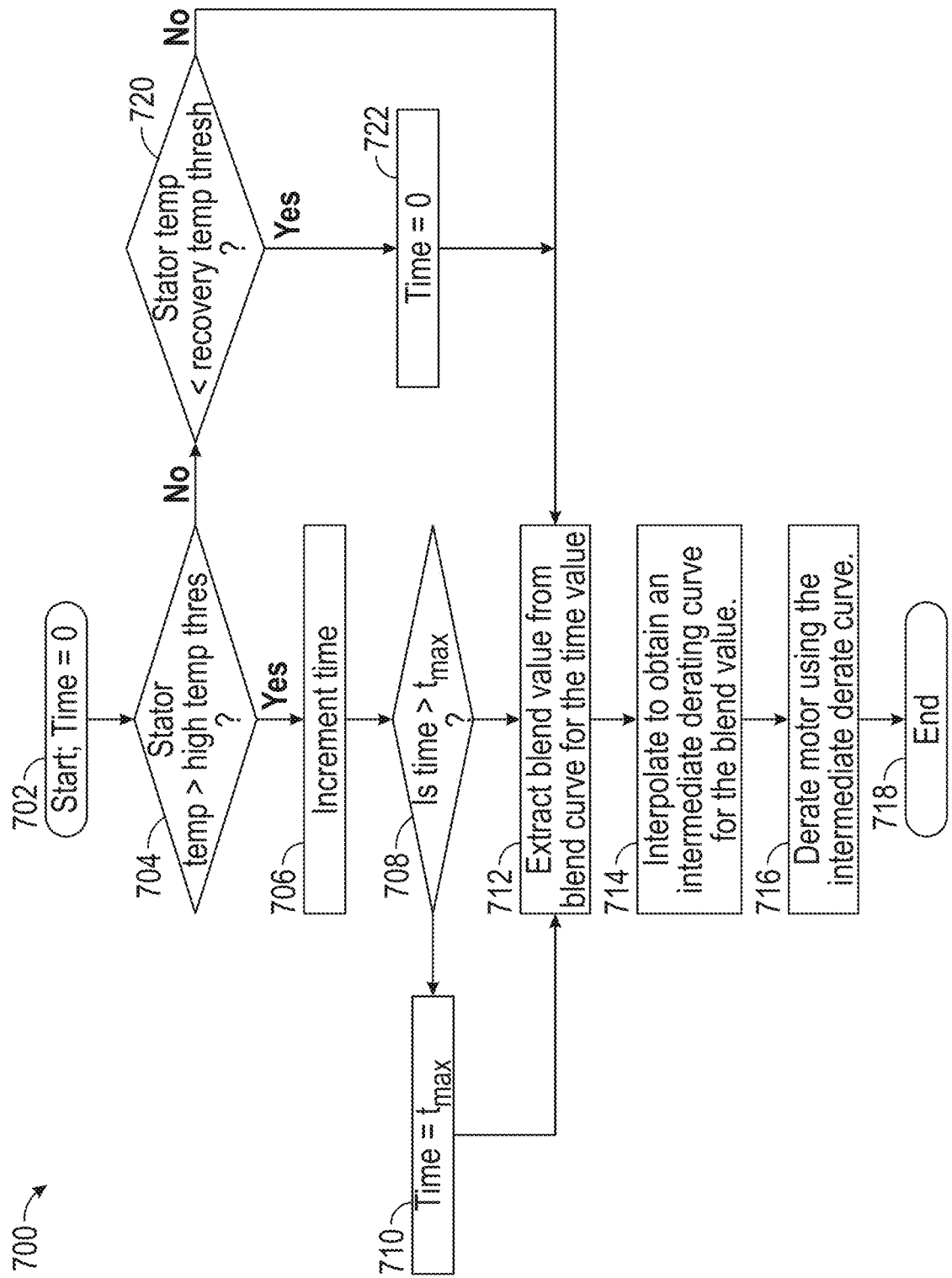
FIG. 7 shows a flowchart of a method for derating the motor, in an illustrative embodiment.

FIG. 7 shows a flowchart 700 of a method for derating the motor, in an illustrative embodiment. The method begins at box 702. In box 702, the motor is operated and the temperature of the motor or of the stator windings (referred to herein as "stator temperature") is measured. A time value of a timer is initialized at t=0. In box 704, the stator temperature is compared to the high temperature threshold 210. If the temperature is greater than the high temperature threshold, the method proceeds to box 706. Otherwise, the method proceeds to box 720.

In box 706, the timer is incremented. In box 708, a time value of the timer is compared to a maximum time ($t_{max}$). If the time value is less than the maximum time, the method proceeds to box 712. Otherwise, the method proceeds to box 710. In box 710, the time value is set to the maximum time. The method the proceeds to box 712. In box 712 the time value is used to select a blend ratio. In box 714, the blend ratio is used to determine an intermediate derating curve. In box 716, the motor is derated using the intermediate derate curve. In box 718, the method ends.

Referring now to box 720, the stator temperature is compared to the recovery temperature threshold 216. If the stator temperature is less than the recovery temperature threshold, the method proceeds to box 722. In box 722, the time value is set to zero. By setting the time value back to zero, the motor is capable of operating into the extended capacity region again. If, at box 720, the stator temperature is greater than the recovery temperature threshold, the method proceeds to box 712.

Figure 7A:
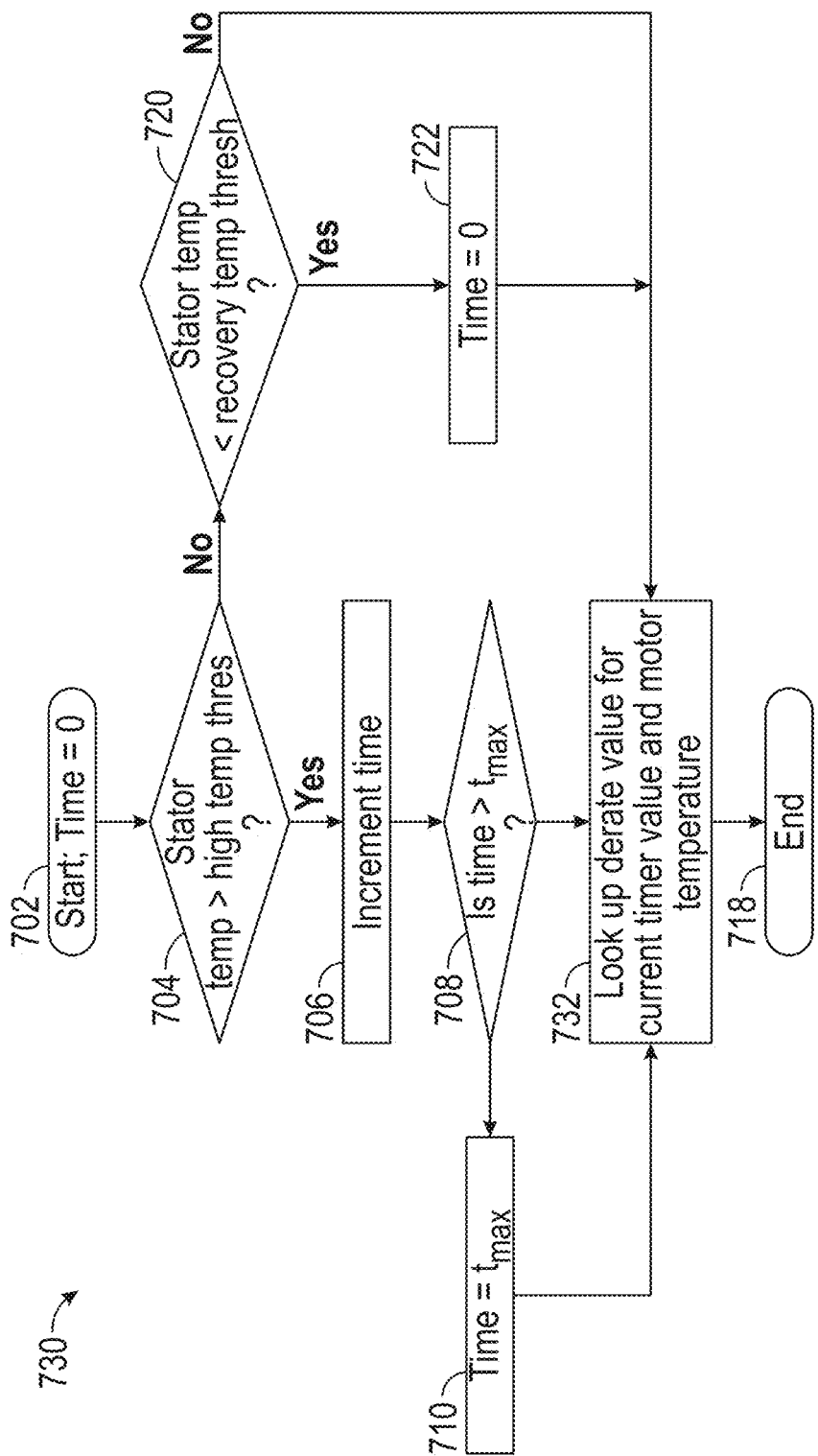
FIG. 7A shows a flowchart of an alternative method for derating the motor.

FIG. 7A shows a flowchart 730 of an alternative method for derating the motor. The flowchart 730 is the same as the flowchart 700 of FIG. 7, except that the steps shown in boxes 712, 714 and 716 have been replaced by box 732, in which the derating value is looked up for the current time value and current motor temperature using the lookup table illustrated in FIG. 6A.

Figure 8:
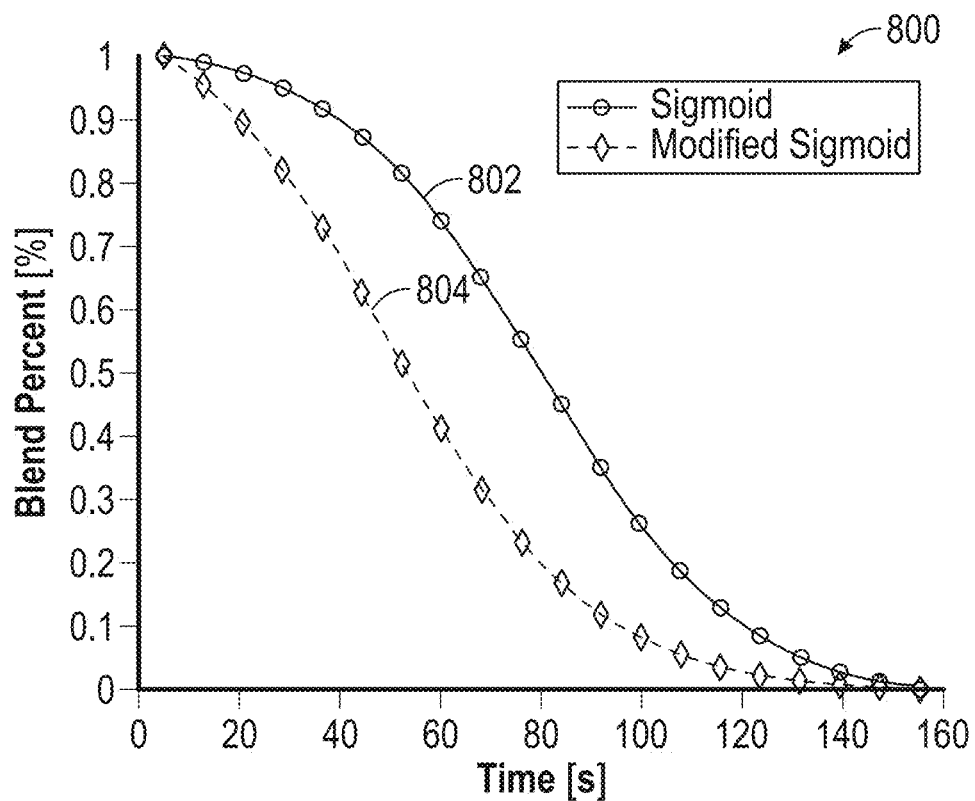
FIG. 8 shows a graph of various blend curves in alternative embodiments.

FIG. 8 shows a graph 800 of various blend curves in alternative embodiments. A first blend curve 802 is a sigmoid curve that decreases from 100% at time t=0 to 0% at time=$t_{max}$. A second blend curve 804 is a modified sigmoid curve that decreases from 100% at time t=0 to 0% at time=$t_{max}$. The sigmoid and modified sigmoid curves are represented mathematically as shown in Eq. (2):

$$\text{blend \%} = \frac{1}{1 + e^{a(t-b)}} \qquad \text{Eq. (2)}$$

where variable t, is time, and a and b are tunable parameters that determine the slope and symmetry of the curve respectively. A value of b that is less than 0.5 results in an asymmetric sigmoid curve (e.g., second blend curve 804), in which a portion of the curve (e.g., between about t=30 seconds and about t=70 seconds) is approximately linear.

Figure 9:
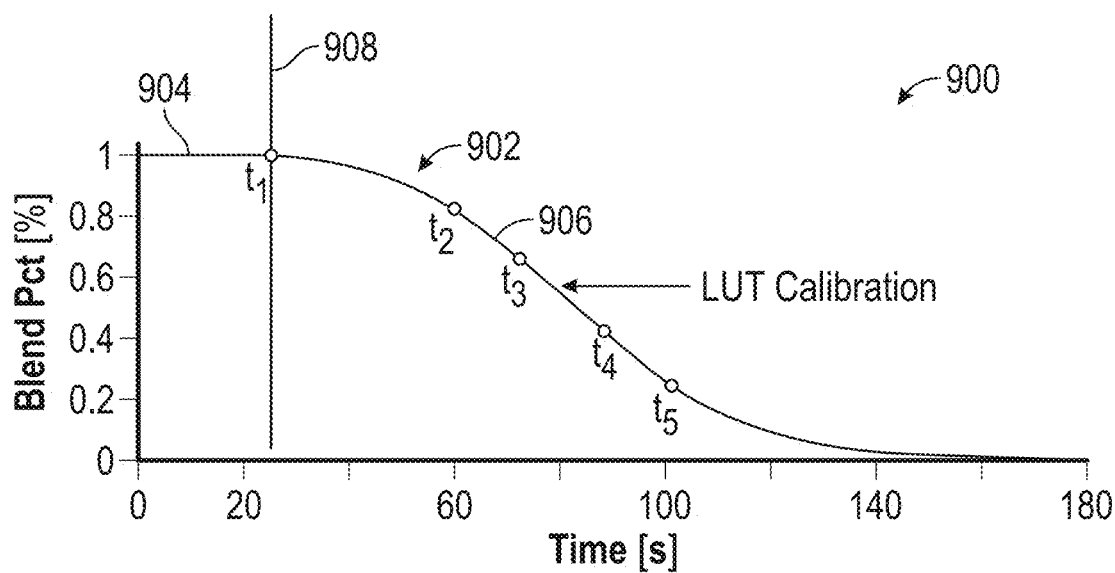
FIG. 9 shows a graph of a blend curve in an alternative embodiment.

FIG. 9 shows a graph 900 of a blend curve in an alternative embodiment. The blend curve 902 includes a first portion 904 and a second portion 906. The first portion 904 remains at 100% until a selected time 908. The second portion 906 can have the shape of any of the blend curves (402, 802, 804) having a decreasing value over time.

Figure 10:
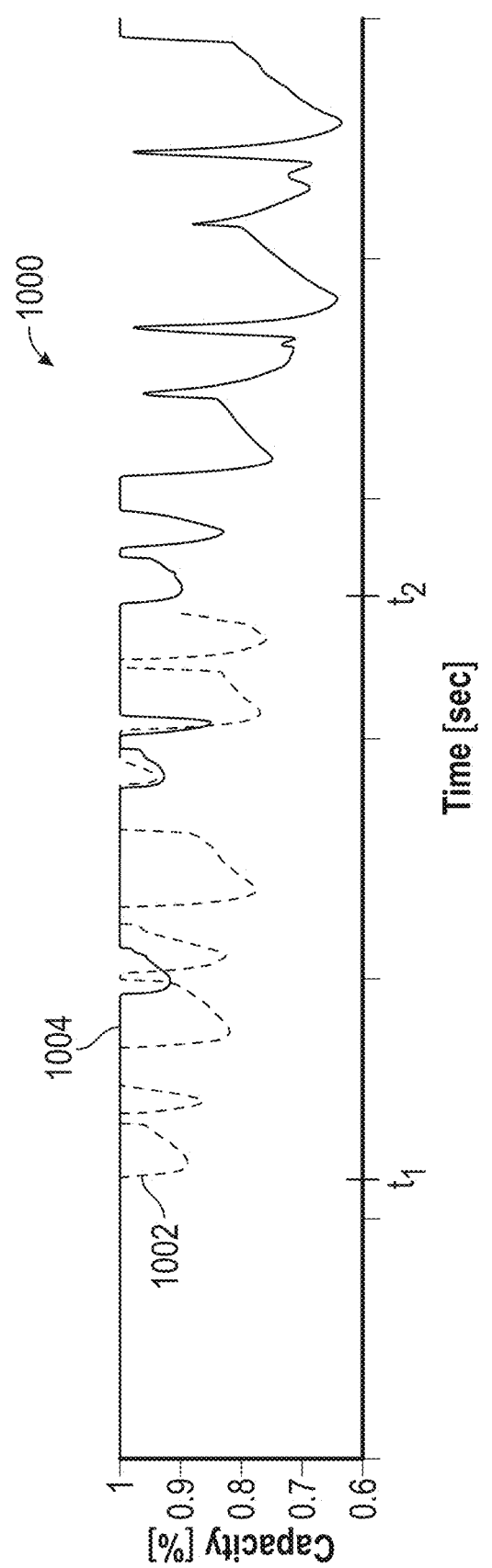
FIG. 10 shows a graph illustrating a torque operation of the motor.

FIG. 10 shows a graph 1000 illustrating a torque operation of the motor. Time is shown in seconds along the abscissa and torque capacity is shown as a percentage along the ordinate axis. A first torque curve 1002 show the torque capacity available to the motor using conventional methods. A second torque curve 1004 shows the torque capacity available to the motor using the methods disclosed herein. The first torque curve 1002 starts to show significant loss of torque capacity at a time $t_1$. The second torque curve 1004 starts to show significant loss of torque capacity at a time $t_2$ that is greater than $t_1$. In various embodiments, the $t_2 \sim 3 \cdot t_1$.

The terms "a" and "an" do not denote a limitation of quantity, but rather denote the presence of at least one of the referenced items. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method of derating a motor of a vehicle, comprising:
   starting a timer when a temperature of a stator of the motor exceeds a high temperature threshold;
   selecting a blend ratio based on a time value on the timer;
   determining, using the blend ratio, an intermediate derating curve for the motor by interpolating between a first derating curve associated with a first target temperature and a second derating curve associated with a second target temperature greater than the first target temperature; and
   derating the motor along the intermediate derating curve.

2. The method of claim 1, wherein the first derating curve is associated with a long-term operation of the motor and the second derating curve is associated with a short-term operation of the motor.

3. The method of claim 1, further comprising incrementing the timer between a first time and a second time, determining a first intermediate derating curve at the first time, determining a second intermediate derating curve at the second time, and derating along a resultant derating trajectory that connects a first operating point on the first intermediate derating curve at the first time to a second operating point on the second intermediate derating curve at the second time.

4. The method of claim 3, wherein the second intermediate derating curve is closer to the first derating curve than the first intermediate derating curve.

5. The method of claim 1, further comprising selecting the blend ratio from a blend curve that relates the blend ratio to time via one of: (i) a sigmoid curve; and (ii) a modified sigmoid curve.

6. The method of claim 5, further comprising storing the blend curve as one of: (i) an equation; and (ii) a look up table.

7. The method of claim 1, further comprising increasing a torque at the motor to operate the motor in an extended capacity region between the first target temperature and the second target temperature after the temperature of the motor drops below a recovery temperature threshold.

8. A system for derating a motor of a vehicle, comprising:
   a timer;
   a processor configured to:
      start the timer when a temperature of a stator of the motor exceeds a high temperature threshold;
      select a blend ratio based on a time value on the timer;
      determine, using the blend ratio, an intermediate derating curve for the motor by interpolating between a first derating curve associated with a first target temperature and a second derating curve associated with a second target temperature greater than the first target temperature; and
      derate the motor along the intermediate derating curve.

9. The system of claim 8, wherein the first derating curve is associated with a long-term operation of the motor and the second derating curve is associated with a short-term operation of the motor.

10. The system of claim 8, wherein the processor is further configured to increment the timer between a first time and a second time, determining a first intermediate derating curve at the first time, determine a second intermediate derating curve at the second time, and derate along a resultant derating trajectory that connects a first operating point on the first intermediate derating curve at the first time to a second operating point on the second intermediate derating curve at the second time.

11. The system of claim 10, wherein the second intermediate derating curve is closer to the first derating curve than the first intermediate derating curve.

12. The system of claim 8, wherein the processor is further configured to select the blend ratio from a blend curve that relates the blend ratio to time via one of: (i) a sigmoid curve; and (ii) a modified sigmoid curve.

13. The system of claim 12, wherein the processor is further configured to store the blend curve as one of: (i) an equation; and (ii) a look up table.

14. The system of claim 8, wherein the processor is further configured to increase a torque at the motor to operate the motor in an extended capacity region between the first target temperature and the second target temperature after the temperature of the motor drops below a recovery temperature threshold.

15. A vehicle, comprising:
a timer;
a processor configured to:
start the timer when a temperature of a stator of a motor exceeds a high temperature threshold;
select a blend ratio based on a time value on the timer;
determine, using the blend ratio, an intermediate derating curve for the motor by interpolating between a first derating curve associated with a first target temperature and a second derating curve associated with a second target temperature greater than the first target temperature; and
derate the motor along the intermediate derating curve.

16. The vehicle of claim 15, wherein the first derating curve is associated with a long-term operation of the motor and the second derating curve is associated with a short-term operation of the motor.

17. The vehicle of claim 15, wherein the processor is further configured to increment the timer between a first time and a second time, determining a first intermediate derating curve at the first time, determine a second intermediate derating curve at the second time, and derate along a resultant derating trajectory that connects a first operating point on the first intermediate derating curve at the first time to a second operating point on the second intermediate derating curve at the second time.

18. The vehicle of claim 17, wherein the second intermediate derating curve is closer to the first derating curve than the first intermediate derating curve.

19. The vehicle of claim 15, wherein the processor is further configured to select the blend ratio from a blend curve that relates the blend ratio to time via one of: (i) a sigmoid curve; and (ii) a modified sigmoid curve.

20. The vehicle of claim 15, wherein the processor is further configured to increase a torque at the motor to operate the motor in an extended capacity region between the first target temperature and the second target temperature after the temperature of the motor drops below a recovery temperature threshold.

* * * * *